(12) United States Patent
Fiacco et al.

(10) Patent No.: US 12,298,554 B2
(45) Date of Patent: May 13, 2025

(54) ANTI-RESONANT HOLLOW CORE OPTICAL FIBER AND METHODS OF MAKING

(71) Applicant: CORNING INCORPORATED, Corning, NY (US)

(72) Inventors: Richard Michael Fiacco, Corning, NY (US); Ming-Jun Li, Horseheads, NY (US); Stephan Lvovich Logunov, Corning, NY (US); Jeffery Scott Stone, Addison, NY (US); Matthew Artus Tuggle, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/875,807

(22) Filed: Jul. 28, 2022

(65) Prior Publication Data
US 2023/0040327 A1  Feb. 9, 2023

Related U.S. Application Data

(60) Provisional application No. 63/230,283, filed on Aug. 6, 2021.

(51) Int. Cl.
*G02B 6/02* (2006.01)
*G02B 6/032* (2006.01)

(52) U.S. Cl.
CPC ......... *G02B 6/02328* (2013.01); *G02B 6/032* (2013.01)

(58) Field of Classification Search
CPC ............ G02B 6/02328; G02B 6/032; C03B 2203/14; C03B 2203/16; C03B 37/02781
See application file for complete search history.

(56) References Cited

U.S. PATENT DOCUMENTS

2014/0199519 A1   7/2014   Schillinger et al.
2017/0044046 A1   2/2017   Miyazaki et al.
(Continued)

FOREIGN PATENT DOCUMENTS

EP    3766843 A1    1/2021
WO    2020/083624 A1    4/2020
(Continued)

OTHER PUBLICATIONS

International Search Report and Written Opinion of the International Searching Authority; PCT/US2022/038479; dated Oct. 25, 2022; 12 pages; European Patent Office.
(Continued)

*Primary Examiner* — Omar R Rojas
(74) *Attorney, Agent, or Firm* — Amy T. Lang

(57) ABSTRACT

An anti-resonant hollow core optical fiber preform that includes an outer cladding, a plurality of structural tubes, and a central support tube. The outer cladding has a length, a central longitudinal axis, and a hollow interior. The plurality of structural tubes are disposed within the hollow interior of the outer cladding, the plurality of structural tubes each having a length that extends the length of the outer cladding. And the central support tube is disposed within the hollow interior of the outer cladding such that the plurality of structural tubes are disposed radially outward of the central support tube, the central support tube having a length that extends along the central longitudinal axis of the outer cladding. Furthermore, the length of the central support tube is less than the length of the outer cladding.

18 Claims, 6 Drawing Sheets

(56) References Cited

U.S. PATENT DOCUMENTS

| | | | |
|---|---|---|---|
| 2020/0156987 A1 | 5/2020 | Wheeler et al. | |
| 2020/0278491 A1 | 9/2020 | Poletti et al. | |
| 2021/0387892 A1* | 12/2021 | Van Leeuwen | C03C 25/68 |
| 2022/0234936 A1 | 7/2022 | Rosenberger et al. | |

FOREIGN PATENT DOCUMENTS

| | | |
|---|---|---|
| WO | 2021/009208 A1 | 1/2021 |
| WO | 2021/009211 A1 | 1/2021 |
| WO | 2021/009218 A1 | 1/2021 |
| WO | 2021/009224 A1 | 1/2021 |
| WO | 2021/009225 A1 | 1/2021 |

OTHER PUBLICATIONS

Kosolapov et al: "Hollow-core revolver fibre with a double-capillary reflective cladding", Quantum Electronics., vol. 46, No. 3, Mar. 29, 2016, pp. 267-270.

Yu, "Hollow core negative curvature fibres", ch.4, In: University of Bath PhD. II, Dec. 31, 2013, pp. 59-74.

* cited by examiner

ANTI-RESONANT HOLLOW CORE OPTICAL FIBER AND METHODS OF MAKING

This Application claims the benefit of priority to U.S. Provisional Patent Application Ser. No. 63/230,283 filed on Aug. 6, 2021, the content of which is relied upon and incorporated herein by reference in its entirety.

FIELD OF THE DISCLOSURE

The present disclosure is generally directed to an anti-resonant hollow core optical fiber and methods of making thereof.

BACKGROUND OF THE DISCLOSURE

Anti-resonant hollow core optical fibers are traditionally comprised of a hollow, outer cladding in which a plurality of glass tubes are arranged. The glass tubes have a smaller diameter and thickness than the outer cladding. Each glass tube is bonded to an inner surface of the outer cladding such that the glass tubes are arranged about the inner circumference of the outer cladding. Furthermore, each glass tube runs parallel to a length of the outer cladding. A central portion of the outer cladding, around which the glass tubes are arranged, remains empty as an air-filled void. The resulting anti-resonant fiber guides light through the empty-central portion of the core. Such anti-resonant fibers are able to provide reduced optical loss of signal.

However, such anti-resonant fibers are extremely difficult to manufacture. Current manufacturing processes involve welding the glass tubes to the outer cladding using either an adhering compound or laser welding. However, both processes can produce suboptimal results in the resulting anti-resonant fiber. More specifically, the adhering compound can act as an attenuator if even a portion of it breaks off and gets deposited on a glass tube. Additionally, laser welding can damage the outer cladding, which results in fibers with poor mechanical strength.

Therefore, there is a need to produce an anti-resonant hollow core optical fiber that does not produce such suboptimal results.

SUMMARY OF THE DISCLOSURE

An exemplary approach to solve the object is described by the independent claims. Various embodiments are defined with the dependent claims.

The present disclosure is directed to an anti-resonant hollow core optical fiber and methods of making thereof. The fiber is produced from a preform that includes a central support tube to secure glass tubes within and to a hollow, outer cladding. The glass tubes each have a length that extends the length of the outer cladding. However, the central support tube extends for less than the length of the outer cladding. More specifically, the central support tube extends for a length sufficient to secure the glass tubes around the inner circumference of the outer cladding. The glass tubes are disposed radially outward of the central support tube and the outer cladding is disposed radially outward of the glass tubes. When manufacturing the anti-resonant hollow core optical fiber from the preform, the portion of the preform comprising the central support tube is removed so that the final fiber is a hollow member throughout its entire length.

According to a first aspect, an anti-resonant hollow core optical fiber preform is disclosed comprising an outer cladding, a plurality of structural tubes, and a central support tube. The outer cladding has a length, a central longitudinal axis, and a hollow interior. The plurality of structural tubes are disposed within the hollow interior of the outer cladding, the plurality of structural tubes each having a length that extends the length of the outer cladding. And the central support tube is disposed within the hollow interior of the outer cladding such that the plurality of structural tubes are disposed radially outward of the central support tube, the central support tube having a length that extends along the central longitudinal axis of the outer cladding. Furthermore, the length of the central support tube is less than the length of the outer cladding.

According to another aspect, a method of making an anti-resonant hollow core optical fiber preform is disclosed. The method comprising the steps of bonding a central support tube to a plurality of structural tubes such that the plurality of structural tubes are disposed radially outward of the central support tube and providing a hollow outer cladding around the central support tube and the plurality of structural tubes. The plurality of structural tubes each extending for a length of the outer cladding and a length of the central support tube being less than the length of the outer cladding.

Although many different embodiments are listed, the embodiments may exist individually or in any combination as possible. Hereinafter exemplary embodiments are shown and described.

DETAILED DESCRIPTION

Figure 1:
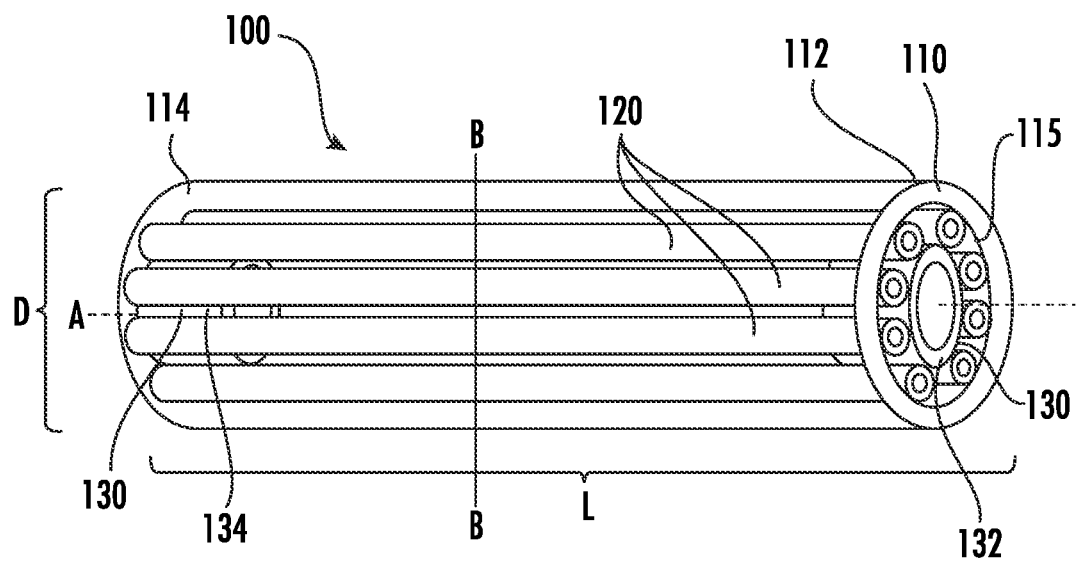
FIG. 1 illustrates a perspective view of a preform to produce an anti-resonant hollow core optical fiber, according to embodiments of the present disclosure.

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

It is also important to note that the construction and arrangement of the elements of the disclosure, as shown in the exemplary embodiments, is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel and nonobvious teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures, and/or members, or connectors, or other elements of the system, may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present disclosure. Other substitutions, modifications, changes, and omissions may be made in the design, operating conditions, and arrangement of the desired and other exemplary embodiments without departing from the spirit of the present disclosure.

Reference will now be made in detail to the present preferred embodiments of the disclosure, examples of which are illustrated in the accompanying drawings. Whenever possible, the same reference numbers will be used throughout the drawings to refer to the same or like parts.

Referring now to FIG. 1, an exemplary anti-resonant hollow core optical preform 100 is shown. Preform 100 has a length L, an outer diameter D, and a central longitudinal axis A. Preform 100 may be drawn to form an anti-resonant hollow core optical fiber. As is known in the art, anti-resonant fibers are one type of hollow core fibers. There are three types of hollow core fibers. The first type is Bragg hollow core fibers in which the cladding is a Bragg structure of concentric periodic dielectric multilayers that confine light in a hollow (air) region. The second type is photonic bandgap hollow core fibers that use a two-dimensional photonic crystal structure with periodically arranged air holes that confine light in the hollow core region. The third type is anti-resonant hollow core fibers in which the fiber comprises one or more layers of thin glass tubes to prevent light from leaking out of the air core. The wall thickness of the glass tubes is chosen such that the light, at certain wavelengths, does not resonate inside the thin glass layer, resulting is zero transmission through the walls of the glass tubes. As shown in FIG. 1, preform 100 comprises an outer cladding 110, a plurality of structural tubes 120, and one or more central support tubes 130. Structural tubes 120 are disposed radially around central support tube 130, and outer cladding 110 is disposed radially around structural tubes 120.

Outer cladding 110 is a hollow, cylindrical member formed of glass. Thus, outer cladding 110 has a hollow interior and forms a ring-like, donut shape in cross-section. In some embodiments, outer cladding 110 is formed of doped or undoped silica glass. Outer cladding 110 has a length equal to length L of preform 100. In some embodiments, the length of outer cladding 110 (and, thus, the length L of preform 100) is about 10 cm to about 2 m, or about 25 cm to about 1.5 m, or about 50 cm to about 1 m.

An outer diameter of outer cladding 110 may be the outer diameter D of preform 100. In some embodiments, the outer diameter of outer cladding 110 (and, thus, the outer diameter D of preform 100) is about 10 mm or greater, or about 20 mm or greater, or about 40 mm or greater, or about 60 mm or greater, or about 80 mm or greater, or about 100 mm or greater, or about 120 mm or greater. Additionally or alternatively, the outer diameter of outer cladding 110 may be about 150 mm or less, or about 140 mm or less, or about 125 mm or less, or about 110 mm or less, or about 100 mm or less, or about 80 mm or less. In some embodiments, the outer diameter is in a range from about 10 mm to about 150 mm, or from about 20 mm to about 125 mm, or from about 10 mm to about 100 mm, or from about 10 mm to about 50 mm. Additionally, outer cladding 110 may have an inner diameter of about 3 mm or greater, or about 5 mm or greater, or about 10 mm or greater, or about 20 mm or greater, or about 40 mm or greater, or about 60 mm or greater, or about 80 mm or greater, or about 100 mm or greater, or about 120 mm or greater. Additionally or alternatively, the inner diameter of outer cladding 110 may be about 125 mm or less, or about 100 mm or less, or about 80 mm or less, or about 60 mm or less, or about 40 mm or less, or about 20 mm or less, or about 10 mm or less. In some embodiments, the inner diameter is in a range from about 3 mm to about 125 mm, or from about 10 mm to about 100 mm, or from about 20 mm to about 60 mm. Thus, outer cladding 110 has a thickness of about 7 mm to about 25 mm, or from about 8 mm to about 20 mm, or from about 10 mm to about 18 mm, or from about 12 mm to about 16 mm.

Structural tubes 120 are glass tubes disposed within the hollow interior of outer cladding 110. Similar to outer cladding 110, structural tubes 120 are hollow, cylindrical members formed of glass. Thus, structural tubes 120 each form a ring-like, donut shape in cross-section. In some embodiments, structural tubes 120 are formed of doped or undoped silica glass. As shown in FIG. 1, structural tubes 120 each have a length that extends the length (or substantially the length) of outer cladding 110. Thus, structural tubes 120 and outer cladding 110 may have the same length. However, structural tubes 120 each have a smaller outer diameter than the outer diameter of outer cladding 110. Structural tubes 120 may have an outer diameter of about 10 mm or greater, or about 15 mm or greater, or about 20 mm or greater, or about 25 mm or greater. Additionally or alternatively, the outer diameter of structural tubes 120 is about 30 mm or less, or about 25 mm or less, or about 20 mm or less, or about 15 mm or less. In some embodiments, the diameter is in a range from about 10 mm to about 35 mm or from about 15 mm to about 30 mm.

Structural tubes 120 may have an inner diameter of about 6 mm or greater, or about 8 mm or greater, or about 12 mm or greater, or about 16 mm or greater, or about 22 mm or greater, or about 24 mm or greater. Additionally or alternatively, structural tubes 120 may have an inner diameter of about 34 mm or less, or about 30 mm or less, or about 29 mm or less, or about 24 mm or less, or about 14 mm or less, or about 12 mm or less, or about 9 mm or less, or about 8 mm or less. In some embodiments, the inner diameter is in a range from about 6 mm to about 34 mm or from about 14 mm to about 29 mm. Therefore, a thickness of structural tubes 120 is in a range from about 0.5 mm to about 2 mm, or from about 0.8 m to about 1.8 mm, or from about 1 mm to about 1.5 mm, or from about 1.2 mm to about 1.4 mm. Accordingly, structural tubes 120 may each have a smaller thickness than the thickness of outer cladding 110.

As shown in FIG. 1, structural tubes 120 are disposed radially inward of outer cladding 110 and are spaced around an inner circumference 115 of outer cladding 110, which forms the inner diameter of outer cladding 110. In some embodiments, and as discussed further below, adjacent structural tubes 120 are spaced apart by a gap.

An outer diameter of each structural tube 120 is less than the inner diameter of outer cladding 110. Therefore, structural tubes 120 do not occupy the entire hollow interior of outer cladding 110. Instead, when structural tubes 120 are spaced around inner circumference 115 of outer cladding 110, a hollow core 140 (FIG. 2) is formed radially inward of structural tubes 120.

As discussed further below, in contrast with traditional anti-resonant hollow core optical fibers, in some embodiments, structural tubes 120 are not bonded to an inner surface of outer cladding 110. Instead, structural tubes 120 are secured in place in preform 100 with one or more central support tubes 130. As further shown in FIG. 1, central support tubes 130 are disposed within the hollow interior of outer cladding 110 such that central support tubes 130 are disposed radially inward of both outer cladding 110 and structural tubes 120. Thus, structural tubes 120 are disposed radially outward of central support tubes 130. FIG. 1 shows an embodiment in which preform 100 comprises a first central support tube 132 at a first end 112 of preform 100 and a second central support tube 134 at a second end 114 of preform 100. However, it is also contemplated that preform 100 may only comprise a single central support tube 130. For example, preform 100 may comprise only first central support tube 132 at first end 112 of preform 100. It is also contemplated, in some embodiments, that one or more central support tubes 130 may be located between first end 112 and second end 114 of preform 100, such as, for example, at a central portion of preform 100.

Similar to outer cladding 110 and structural tubes 120, central support tubes 130 are hollow, cylindrical members formed of glass. Thus, structural tubes 120 each form a ring-like, donut shape in cross-section. It is noted that central support tubes 130 are hollow in order for gas to flow within preform 100 and, thus, to maintain a predetermined pressure within preform 100. In some embodiments, central support tubes 130 are formed of doped or undoped silica glass. As discussed further below, the portion of preform 100 comprising central support tubes 130 may be discarded rather than drawn into an optical fiber. Thus, central support tubes 130 may be formed of a glass material that is of a lower quality than that of outer cladding 110 and/or structural tubes 120. For example, the material of central support tubes 130 may have a lower viscosity and/or be less pure than the material of outer cladding 110 and/or structural tubes 120.

As shown in FIG. 1, central support tubes 130 each have a length that extends along the central longitudinal axis of outer cladding 110. Thus, central support tubes 130 are coaxial with outer cladding 110 and are parallel to both outer cladding 110 and structural tubes 120. However, the length of each central support tube 130 is less than the length of outer cladding 110. Additionally, the length of each central support tube 130 may be less than the length of structural tubes 120. In some embodiments, the length of each central support tube 130 is less than the length of at least one structural tube 120. In other embodiments, the length of each central support tube 130 is less than the length of each structural tube 120.

The length of each central support tube 130 is about one-half, or about one-third, or about one-fourth, or about one-fifth, or about one-sixth, or about one-tenth, or about one-fifteenth, or about one-twentieth, or about one-thirtieth of the length of outer cladding 110. For example, in some embodiments, the length of each central support tube 130 is about 20 cm or less, or about 15 cm or less, or about 10 cm or less, or about 7 cm or less, or about 5 cm or less, or about 3 cm or less, or about 2.5 cm or less, or about 2.25 cm or less, or about 2.0 cm or less, or about 1.75 cm or less, or about 1.5 cm or less, or about 1.25 cm or less, or about 1.0 cm or less, or about 0.5 cm or less. Additionally or alternatively, the length of each central support tube 130 is about 0.5 cm or greater, or about 1.0 cm or greater, or about 1.25 cm or greater, or about 1.5 cm or greater, or about 1.75 cm or greater, or about 2.0 cm or greater, or about 2.25 cm or greater, or about 2.5 cm or greater, or about 3 cm or greater, or about 5 cm or greater. In some embodiments, the length of each central support tube 130 is in a range from about 0.5 cm to about 10 cm, or about 1.0 cm to about 8 cm, or about 1.25 cm to about 5 cm. It is also contemplated that first central support tube 132 may have a different length from second central support tube 134.

Central support tubes 130 may have an outer diameter of about 20 mm or greater, or about 25 mm or greater, or about 30 mm or greater, or about 35 mm or greater, or about 40 mm or greater, or about 45 mm or greater, or about 50 mm or greater. Additionally or alternatively, the outer diameter of central support tubes 130 is about 70 mm or less, or about 65 mm or less, or about 60 mm or less, or about 55 mm or less, or about 50 mm or less, or about 45 mm or less, or about 40 mm or less. In some embodiments, the outer diameter is in a range from about 20 mm to about 70 mm, or from about 25 mm to about 65 mm, or from about 30 mm to about 60 mm. Central support tubes 130 may have an inner diameter of about 10 mm or greater, or about 12 mm or greater, or about 18 mm or greater, or about 20 mm or greater, or about 24 mm or greater, or about 26 mm or greater, or about 30 mm or greater, or about 34 mm or greater. Additionally or alternatively, central support tubes 130 may have an inner diameter of about 60 mm or less, or about 54 mm or less, or about 52 mm or less, or about 46 mm or less, or about 42 mm or less, or about 38 mm or less, or about 34 mm or less, or about 28 mm or less. The inner diameter may be in a range from about 10 mm to about 60 mm or from about 20 mm to about 40 mm. Thus, a thickness of each central support tube 130 may be in a range from about 5 mm to about 20 mm or from about 10 mm to about 15 mm. As shown in FIG. 1, an outer diameter of central support tubes 130 is greater than the outer diameter of each structural tube 120. However, as discussed further below, it is also contemplated that the outer diameter of central support tube 130 is smaller than or equal to the outer diameter of one or more structural tubes 120. In some embodiments, the outer diameter of central support tube 130 is smaller than the outer diameter of each structural tube 120. It is also contemplated that first central support tube 132 may have a different outer diameter and/or inner diameter from second central support tube 134.

Figure 2:
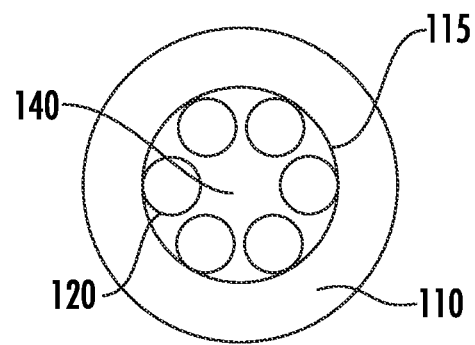
FIG. 2 illustrates a cross-sectional view of the preform along line B-B of FIG. 1, according to embodiments of the present disclosure.

FIG. 2 shows a cross-sectional view of preform 100 along line B-B of FIG. 1. As shown in FIG. 2, structural tubes 120 are arranged around inner circumference 115 of outer cladding 110 such that hollow core 140 is formed radially inward of structural tubes 120. FIG. 2 is a cross-sectional view of a center portion of preform 100 and, thus, does not show central support tubes 130, which are located at the ends of preform 100 in the embodiment of FIGS. 1 and 2.

Figure 3A:
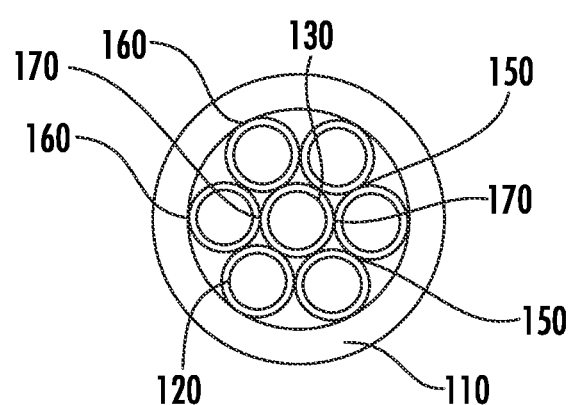
FIGS. 3A-3E illustrate cross-sectional views of various exemplary embodiments of the preform, according to embodiments of the present disclosure.
Figure 3B:
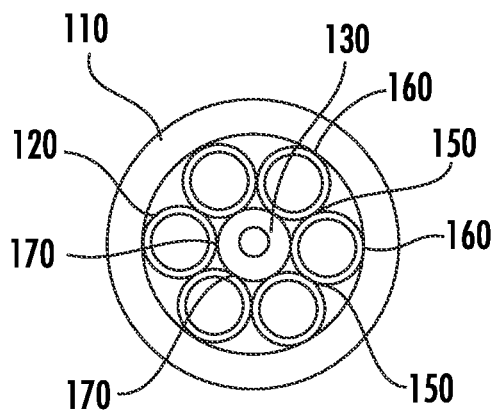
Figure 3C:
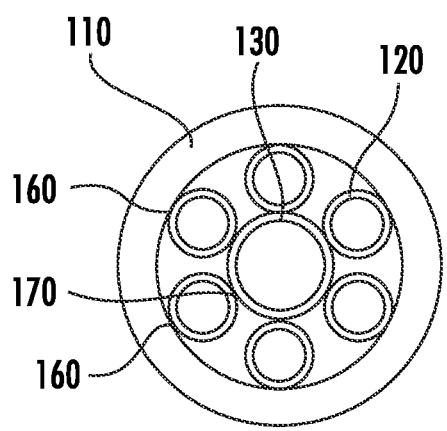
Figure 3D:
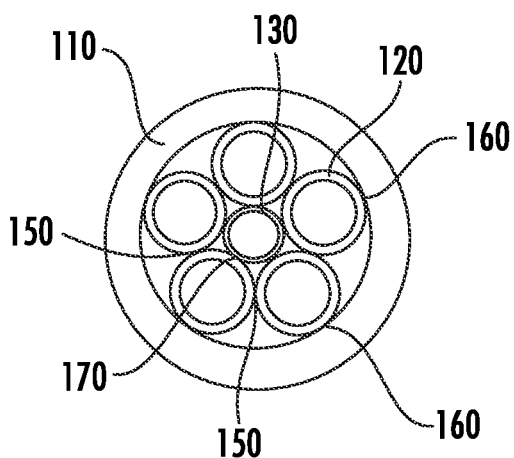

FIGS. 3A-3E show cross-sectional views of various exemplary embodiments of central support tubes 130 within preform 100. More specifically, FIG. 3A shows an embodiment in which structural tubes 120 and central support tube 130 all have the same outer diameter, inner diameter, and thickness. FIG. 3B shows an embodiment in which structural tubes 120 and central support tube 130 have the same outer diameter. However, in this embodiment, central support tube 130 has a smaller inner diameter and, thus, a larger thickness than structural tubes 120. FIG. 3C shows an embodiment in which central support tube 130 has a larger outer dimeter and a larger inner diameter than structural tubes 120. Furthermore, in this embodiment, central support tube 130 and structural tubes 120 have the same thickness, although it is also contemplated that they can comprise differing thicknesses. FIG. 3D shows an embodiment in which central support tube 130 has a smaller outer diameter and a smaller inner diameter from structural tubes 120. Furthermore, in this embodiment, central support tube 130 has a smaller thickness than structural tubes 120.

It is also noted that in the embodiments of FIGS. 3A-3D, structural tubes 120 are all of uniform dimensions for each embodiment. Thus, for example, structural tubes 120 in FIG. 3A are all the same size with the same outer diameter, inner diameter, and thickness. However, it is also contemplated in the embodiments disclosed herein that one or more structural tubes 120 may have different dimension(s) from one or more other structural tubes 120. For example, with reference again to the embodiment of FIG. 3A, one or more structural tubes 120 may be thicker than one or more other structural tubes 120 in this embodiment.

Figure 3E:
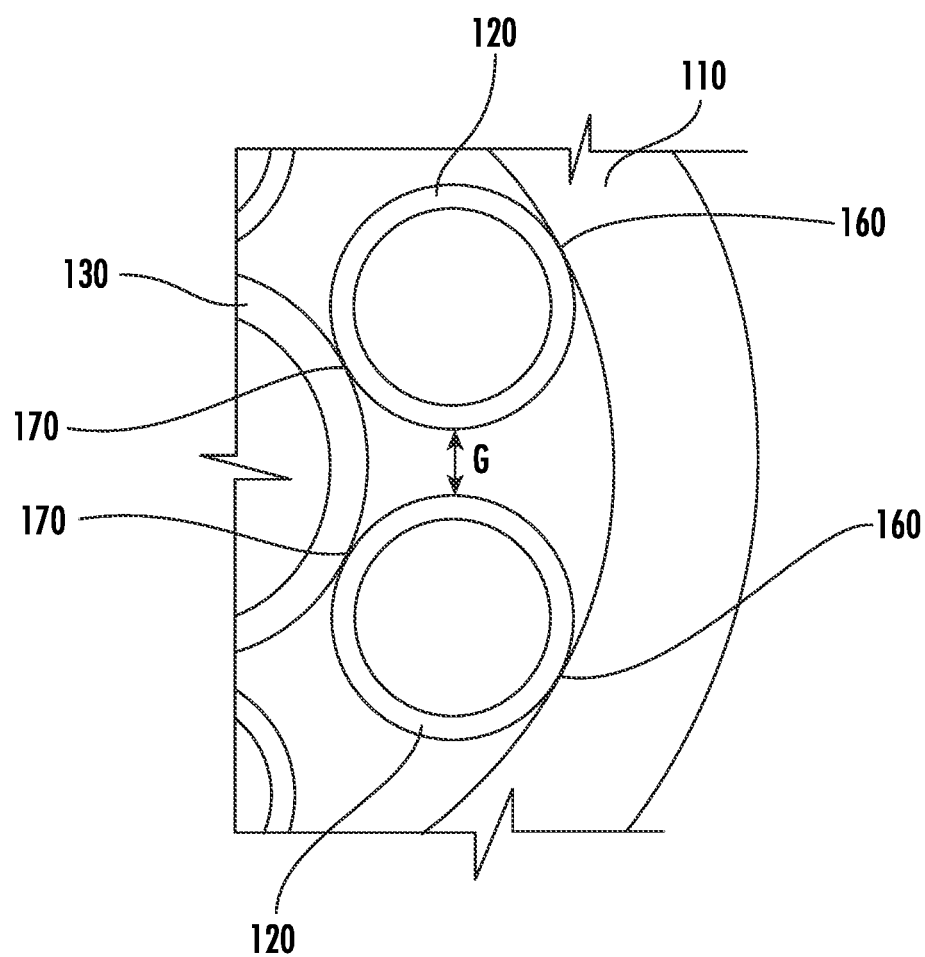

In the exemplary embodiments of FIGS. 3A, 3B, and 3D, structural tubes 120 are each in direct contact with an adjacent structural tube 120. Thus, structural tubes 120 form points of contact 150 with adjacent structural tubes 120. However, in the embodiment of FIG. 3C, adjacent structural tubes 120 are not in direct contact. Thus, in this embodiment, preform 100 does not comprise points of contact 150 between adjacent structural tubes 120. Instead, in the embodiment of FIG. 3C, adjacent structural tubes 120 are separated by a gap G. FIG. 3E shows an enlarged view of a portion of FIG. 3C to better illustrate gap G. As disclosed herein, gap G is the minimum distance between adjacent structural tubes 120 that are not in direct contact with each other. The length of gap G may be constant between structural tubes 120 in the same preform 100, such that all structural tubes 120 are evenly spaced around inner circumference 115. However, it is also contemplated that structural tubes 120 are not all evenly spaced around circumference 115, such that, for example, a first gap G between first and second structural tubes 120 is of a different length from at least a second gap G between third and fourth structural tubes 120.

Gap G may have a length of about 1 mm or greater, or about 1.2 mm or greater, or about 1.4 mm or greater, or about 1.6 mm or greater, or about 1.8 mm or greater, or about 2 mm or greater, or about 2.2 mm or greater, or about 2.4 mm or greater, or about 2.6 mm or greater, or about 2.8 mm or greater, or about 3 mm or greater, or about 3.2 mm or greater, or about 3.4 mm or greater, or about 3.6 mm or greater, or about 3.8 mm or greater, or about 4 mm or greater. Additionally or alternatively, gap G may have a length of about 5 mm or less, or about 4.8 m or less, or about 4.6 mm or less, or about 4.4 mm or less, or about 4.4 mm or less, or about 4.2 mm or less, or about 4 mm or less, or about 3.8 mm or less, or about 3.6 mm or less, or about 3.4 mm or less, or about 3.2 mm or less, or about 3 mm or less. In some embodiments, the length is in a range from about 1 mm to about 5 mm, or from about 2.5 mm to about 4.5 mm, or from about 3 mm to about 4 mm.

Although gap G is disclosed herein with reference to FIGS. 3C and 3E, it is also contemplated that one or more other embodiments may comprise gap G between structural tubes 120. For example, an embodiment in which central support tube 130 has a larger thickness than structural tubes 120, such as that shown in FIG. 3B, may comprise gaps G between adjacent structural tubes 120.

It is also noted that the embodiments of FIGS. 3A, 3B, and 3C show exemplary embodiments in which preform 100 comprises six structural tubes 120. However, the exemplary embodiment of FIG. 3D comprises five structural tubes 120. It is further contemplated that the preform 100 of the embodiments disclosed herein may comprise more or less structural tubes 120. For example, preform 100 may comprise 1 or more, or 2 or more, or 3 or more, or 4 or more, or 5 or more, or 6 or more, or 7 or more, or 8 or more, or 9 or more, or 10 or more, or 11 or more, or 12 or more structural tubes 120. Additionally or alternatively, preform 100 may comprise 20 or less, or 19 or less, or 18 or less, or 17 or less, or 16 or less, or 15 or less, or 14 or less, or 13 or less, or 12 or less, or 11 or less, or 10 or less, or 9 or less, or 8 or less structural tubes 120. In some embodiments, preform 100 comprises between 4 and 10 structural tubes 120, or between 5 and 8 structural tubes 120.

As discussed above, structural tubes 120 may form points of contact 150 with adjacent structural tubes 120. Furthermore, as also shown in FIGS. 3A-3E, structural tubes 120 may form points of contact 160 with outer cladding 110 and points of contact 170 with central support tube 130. The points of contact 150, 160, 170 may each be one distinct point of direct contact between the different glass components or segments of the different glass components that are in direct contact with each other. Although structural tubes 120 contact outer cladding 110 at points of contact 160, in some embodiments, structural tubes 120 are not bonded to outer cladding 110. By not bonding structural tubes 120 to outer cladding 110, such helps to avoid damage to outer cladding 110. For example, laser welding structural tubes 120 to outer cladding 110 can potentially damage outer cladding 110 by causing portions of outer cladding 110 to break off. Any damage to outer cladding 100 can potentially result in fibers with poorer mechanical strength. Thus, embodiments of the present disclosure include wherein structural tubes 120 are not bonded to outer cladding 110, even if these components are still in direct contact with each other at points of contact 160.

However, it is also contemplated in other embodiments that structural tubes 120 are bonded to outer cladding 110 at points of contact 160. Furthermore, structural tubes 120 may be bonded to central support tube 130 at points of contact 170. Additionally or alternatively, structural tubes 120 may be bonded to adjacent structural tubes 120 at points of contact 150. Thus, points of contact 160, 150 and/or 170 may form bonding locations.

In some embodiments, these bonding locations are formed by laser welding, for example using a carbon monoxide (CO) laser, carbon dioxide ($CO_2$) laser, or a yttrium doped laser, such as a yttrium aluminum garnet (YAG) laser. In some embodiments, the laser is a yttrium doped laser with a wavelength of 1.06 microns, or a ND:YAG laser with a wavelength of 0.06 microns that delivers a laser beam having pulses of 0.1-2.0 kW pulse power. In other embodiments, the laser is an Er:YAG laser with a wavelength between 1.5 and 1.8 microns. In other embodiments, the laser is a carbon monoxide laser with a wavelength of 10 microns or less, or 8 microns or less, or 5 microns or less, or 4 microns or less, or 2 microns or less. A carbon monoxide laser may be preferred over a carbon dioxide laser due to the deeper penetration within the silica glass, thus resulting in less surface damage and a stronger weld between the different glass components.

The laser can modify the glass materials along a desired depth into the glass materials. In some embodiments, the depth ranges from about 0.1 microns to about 5 mm, or about 10 microns to about 4 mm, or about 50 microns to about 3 mm, or about 100 microns to about 2 mm, or about 200 microns to about 1 mm, or about 200 microns to about 800 microns The laser may be a pulsed laser that generates a single laser pulse, or burst of pulses, of a pulsed line focus laser beam to interact with the glass materials. The laser beam is characterized by a focal line that generates an induced absorption within the glass materials so that a material modification is produced within the materials. The pulse duration of the laser may be chosen such that no significant heat transport (heat diffusion) takes place within the materials. In some embodiments, the pulse duration is between about 0.1 ps and 100 ps, and preferably less than 15 ps.

The average diameter δ of the laser beam focal line (the spot diameter) is between about 0.3 microns and about 5.0 microns, or between about 1.0 microns and about 3.0 microns, or between about 0.4 microns and about 4.0 microns. The pulse repetition rate of the laser is between about 10 kHz and about 1000 kHz (e.g., about 100 kHz), and/or in that the laser is operated as a single-pulse laser or as a burst-pulse laser, with energies per burst pulse between 40 uJ and 1000 uJ, and/or in that the average laser power, measured directly on the output side of the beam of the laser, is between about 10 watts and about 100 watts (e.g., between about 30 watts and about 50 watts).

Reference is made to U.S. Patent Publication No. US20140199519, which is incorporated herein by reference as set forth in its entirety, for a more detailed explanation of the laser and an imaging system for producing such a laser.

Bonding of points of contact 150, 160, and/or 170 using the above-disclosed laser welding processes may provide, for example, structural tubes 120 welded to central support tube 130. Additionally, such may provide one or more structural tubes 120 each bonded to an adjacent structural tube 120.

Figure 4:
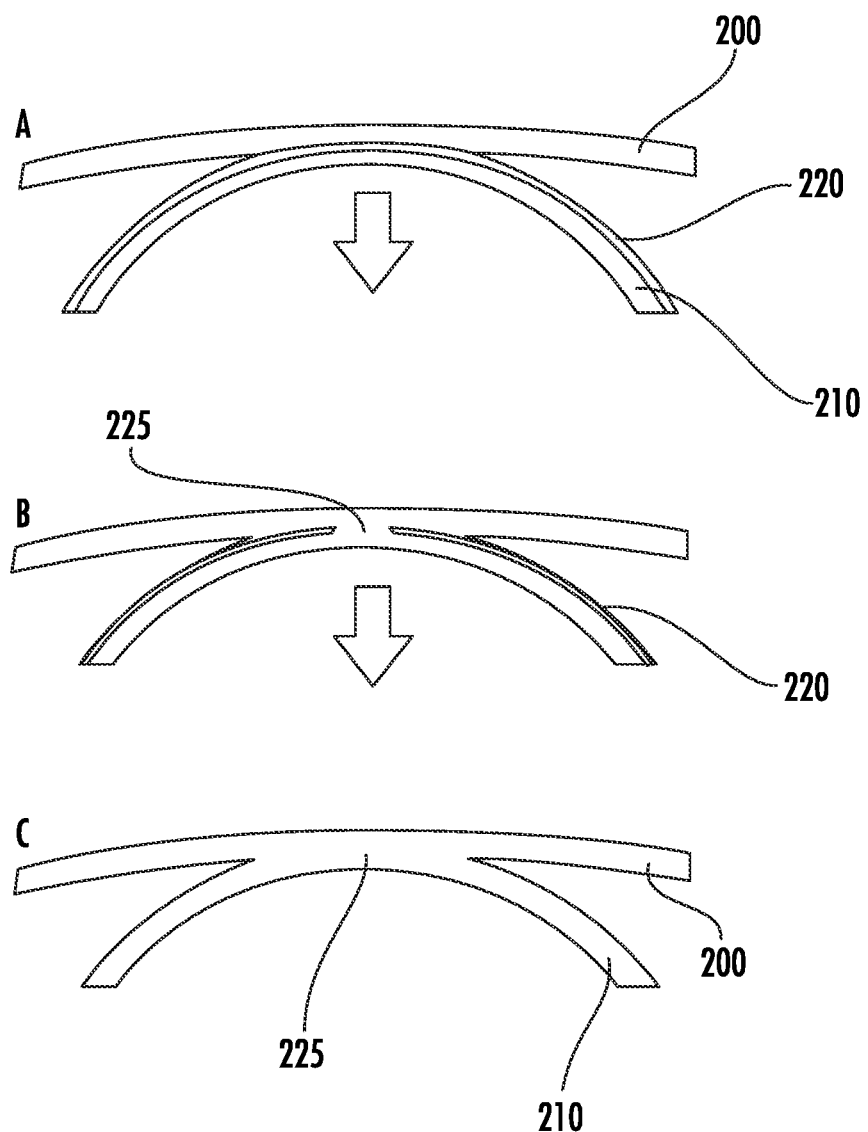
FIG. 4 illustrates an exemplary process to bond glass materials to form the preform, according to embodiments of the present disclosure.

In some embodiments, the bonding locations (formed at points of contact 160, 150 and/or 170) may be formed using not only a laser, as disclosed above, but also an absorbing film. As shown in FIG. 4, a first glass material 200 is bonded to a second glass material 210 using an absorbing film 220. As discussed above, first glass material 200 and second glass material 210 may each be outer cladding 110, structural tubes 120, and central support tube 130 to from contact points 150, 160, 170. In a first example, first glass material 200 is a structural tube 120 and second glass material 210 is central support tube 130. In a second example, first glass material 200 is a first structural tube 120 and second glass material 210 is a second structural tube 120. An absorbing film 220 is disposed at least at the contact point between first glass material 200 and second glass material 210 (step A of FIG. 4). The laser beam of the laser may be of a sufficient wavelength so that it is transparent to the materials of first glass material 200 and second glass material 210. However, the laser beam is not transparent to the material of absorbing film 220 and, instead, absorbing film 220 is absorbent to the laser beam at such wavelengths. Therefore, the laser beam, at such wavelengths, causes an induced absorption in the absorbing film 220. Absorbing film 220 is heated by the laser beam to form a bond 225 between first and second glass materials 200, 210, while these glass materials remain unaffected by the laser beam (step B of FIG. 4). In some embodiments, the laser beam has a wavelength of 1060 nm. Next, the remainder of absorbing film 220 is removed, such as by a chemical treatment (step C of FIG. 4). In some embodiments, absorbing film 220 is removed by a chemical etching step.

In some embodiments, absorbing film 220 is a metal material such as, for example, stainless steel, aluminum, copper, titanium, chromium, or other thin metal films with a melting temperature between about 600° C. and about 1300° C. and with absorption of more than about 30% at a specified laser wavelength. A thickness of absorbing film 220 may be in a range from about 20 nm or greater, or about 40 nm or greater, or about 60 nm or greater, or about 80 nm or greater, or about 100 nm or greater. Additionally or alternatively, the thickness of absorbing film 220 is about 200 nm or less, or about 180 nm or less, or about 160 nm or less, or about 140 nm or less, or about 120 nm or less, or about 100 nm or less, or about 80 nm or less. In some embodiments, the thickness is in a range from about 60 nm to about 120 nm or about 80 nm to about 100 nm.

Figure 5:
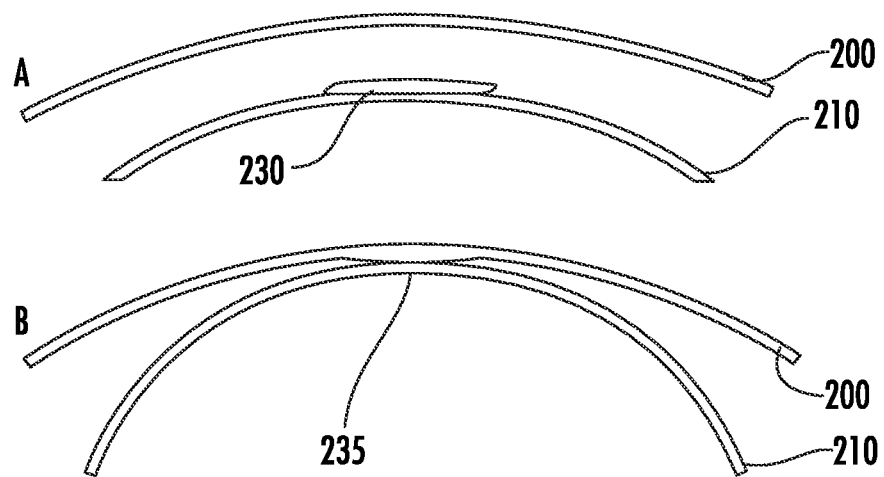
FIG. 5 illustrates another exemplary process to bond glass materials to form the preform, according to embodiments of the present disclosure.

In yet some other embodiments, the bonding locations (formed at points of contact 150, 160 and/or 170) are formed using a joining member and a heat source. As shown in FIG. 5, joining member 230 may be disposed on at least one of first and second glass materials 200, 210 (step A of FIG. 5). A heating source may then cause localized heating of joining member 230, thus creating a bond 235 between first and second glass materials 200, 210 (step B of FIG. 5). In some embodiments, joining member 230 is one or more layers of silica soot, such as pure silica soot, so that heating of joining member 230 sinters and consolidates the silica soot. Therefore, no additional step is required to remove the excess material of joining member 230. Instead, the consolidated silica soot becomes part of preform 100. Joining member 230 may comprise the same material as structural tubes 120 and/or outer cladding 110. In embodiments where joining member 230 is consolidated in a consolidation furnace, joining member 230 may be doped with a doping agent such as, for example, fluorine (F) or chlorine (Cl), which advantageously reduces the contact angle between first and second glass materials 200, 210. Reducing the contact angle between the glass materials provides a smaller coupling point between the glass materials, which reduces any loss of light within the drawn optical fiber. The doping agent (such as F or Cl) affects the wetting behavior of the glass materials and, thereby, reduces the contact angle between the glass materials. The heat source may be a laser, as disclosed above, a flame, or other heat sources as are known in the art.

Figures 6A, 6B:
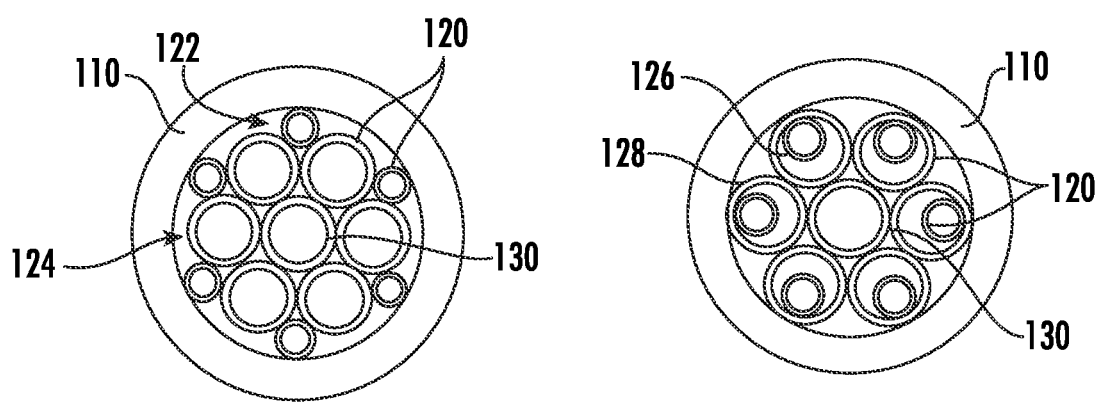
FIGS. 6A and 6B illustrate additional cross-sectional views of various exemplary embodiments of the preform, according to embodiments of the present disclosure.

FIGS. 6A and 6B show additional exemplary embodiments of preform 100. As shown in FIG. 6A, preform 100 may comprise two rings of structural tubes 120, such as an outer ring 122 and an inner ring 124. In the embodiment of FIG. 6A, structural tubes 120 of inner ring 124 have larger inner and outer diameters from those of outer ring 122. Furthermore, in the embodiment of FIG. 6B, structural tubes 120 comprise nested tubes. More specifically, structural tubes 120 comprise an inner tube 126 (a second structural tube) nested within an outer tube 128 (a first structural tube). However, the present disclosure is not limited to the exemplary arrangements disclosed herein. Other embodiments of preform 100 are also contemplated.

Embodiments of the present disclosure also comprise methods of making preform 100. Such methods include boding central support tube 130 to the plurality of structural tubes 120 such that the plurality of structural tubes 120 are disposed radially outward of central support tube 130. In some embodiments, this bonding step comprises bonding first central support tube 132 and second central support tube 134 to structural tubes 120. As discussed above, the bonding may be at points of contact 170. Furthermore, the plurality of structural tubes 120 may be bonded to each other at points of contact 150. In some embodiments, the plurality of structural tubes 120 are also bonded to outer cladding 110 at points of contact 160. In other embodiments, the plurality of structural tubes 120 are not bonded to outer cladding 110. As discussed above, the bonding at points of contact 150, 160, and/or 170 may be provided by welding, such as laser welding, absorbing film 220, or joining member 230 (such as silica soot). The methods of making preform 100 further comprise providing outer cladding 110 around central support tube 130 and structural tubes 120. Such may be performed before or after the above discussed bonding steps. In some embodiments, structural tubes 120 are first bonded to central support tube(s) 130 before being placed within outer cladding 110.

Figure 7:
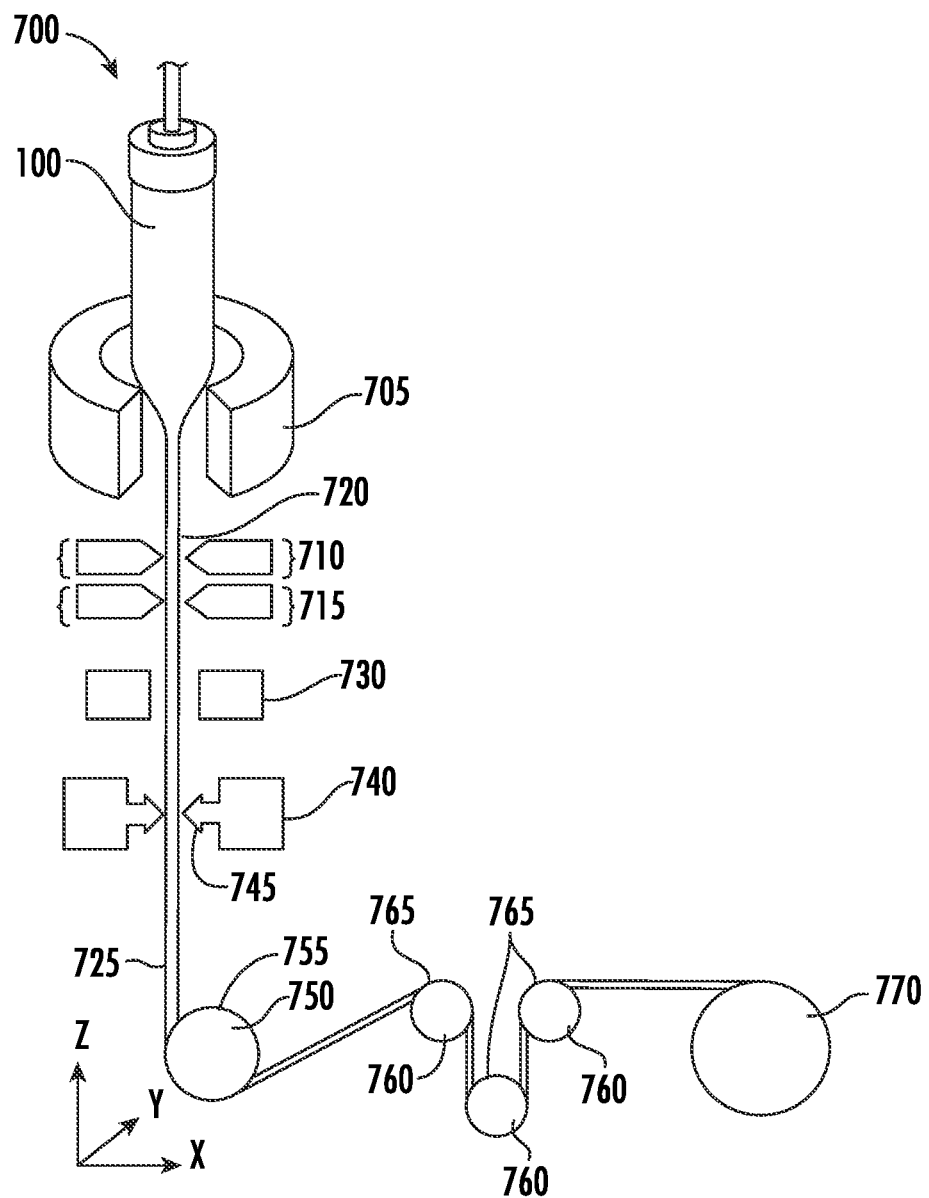
FIG. 7 illustrates a schematic diagram of an exemplary drawing system.

Embodiments of the present disclosure also include drawing an optical fiber from preform 100. FIG. 7 shows a drawing system 700 for drawing an optical fiber according to the embodiments disclosed herein. Exemplary drawing system 700 comprises a furnace 705 for heating perform 100 to its glass melt temperature. Furnace 705 may be disposed in a draw tower. In some embodiments, furnace 705 comprises a heater such that preform 100 is consumed and drawn into an optical fiber 720 as it is lowered towards the heater. The portions of preform 100 that comprise a central support tube 130 may be removed and discarded such that they are not drawn into the final optical fiber 720. For example, the portions of preform 100 that comprise a central support tube 130 may be heated to a temperature sufficient to cause these portions of preform 100 to be transformed such that a glass gob melts off preform 100 by the influence of gravity. The gob corresponds to a portion of preform 100 comprising a central support tube 130. An operator may further strip away and remove additional glass from preform 100 until the portion of preform 100 comprising central support tube 130 has been completely removed. In one example, a first end of preform 100 (such as first end 112) comprises central support tube 130 and this first end is heated to gob and remove this portion from preform 100. After the desired portions are removed from preform 100, preform 100 may continue to be heated by furnace 705 and drawn into optical fiber 720. Thus, embodiments of the present disclose include removing central support tube 130 from preform 100 before drawing preform 100 into optical fiber 720.

Furthermore, as shown in FIG. 7, drawing system 700 comprises non-contact measurement sensors 710, 715 for measuring the size (e.g., diameter control) of the drawn (bare) optical fiber 720 that exits furnace 705. A cooling station 730 resides downstream of the measurement sensors 710, 715 and is configured to cool the bare optical fiber 720. A coating station 740 resides downstream of cooling station 730 and is configured to deposit a protective coating material 745 onto the bare fiber 720 to form a coated fiber 725. A tensioner 750 resides downstream of the coating station 740. The tensioner 750 has a surface 755 that pulls (draws) the coated fiber 725. A set of guide wheels 760 with respective surfaces 765 resides downstream of the tensioner 750. The guide wheels 760 serve to guide the coated fiber 725 to a fiber take-up spool ("spool") 770 to store the coated fiber 725. Embodiments of the present disclosure can be used to form an anti-resonant hollow core optical fiber.

While various embodiments have been described herein, they have been presented by way of example only, and not limitation. It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of the present disclosure. The elements of the embodiments presented herein are not necessarily mutually exclusive, but may be interchanged to meet various needs as would be appreciated by one of skill in the art.

It is to be understood that the phraseology or terminology used herein is for the purpose of description and not of limitation. The breadth and scope of the present disclosure should not be limited by any of the above-described exemplary embodiments, but should be defined only in accordance with the following claims and their equivalents.

What is claimed is:

1. An anti-resonant hollow core optical fiber preform comprising:
   an outer cladding having a length, a central longitudinal axis, and a hollow interior;
   a plurality of structural tubes disposed within the hollow interior of the outer cladding, the plurality of structural tubes each having a length that extends the length of the outer cladding, adjacent structural tubes being separated by a gap such that a minimum distance between adjacent structural tubes is from about 1 mm to about 5 mm; and
   a central support tube disposed within the hollow interior of the outer cladding such that the plurality of structural tubes are disposed radially outward of the central support tube, the central support tube having a length that extends along the central longitudinal axis of the outer cladding, and the length of the central support tube being about 10 cm or less and being less than the length of the outer cladding and each of the plurality of structural tubes,
   wherein the plurality of structural tubes are each bonded to the central support tube.

2. The anti-resonant hollow core optical fiber preform of claim 1, wherein the length of the central support tube is about 3 cm or less.

3. The anti-resonant hollow core optical fiber preform of claim 2, wherein the length of the central support tube is about 2 cm or less.

4. The anti-resonant hollow core optical fiber preform of claim 1, wherein the plurality of structural tubes are each welded to the central support tube.

5. The anti-resonant hollow core optical fiber preform of claim 1, wherein the plurality of structural tubes are bonded to the central support tube with a layer of silica soot.

6. The anti-resonant hollow core optical fiber preform of claim 1, wherein the central support tube is disposed at a first end of the outer cladding and further comprising a second central support tube disposed at a second end of the outer cladding, the plurality of structural tubes being disposed radially outward of the second central support tube, and the second central support tube having a length that is less than the length of the outer cladding.

7. The anti-resonant hollow core optical fiber preform of claim 6, wherein the central support tube does not contact the second central support tube.

8. The anti-resonant hollow core optical fiber preform of claim 1, wherein the plurality of structural tubes each comprise silica glass.

9. The anti-resonant hollow core optical fiber preform of claim 1, wherein the plurality of structural tubes are each a hollow tube.

10. The anti-resonant hollow core optical fiber preform of claim 9, further comprising a second structural tube disposed within each of the plurality of structural tubes.

11. The anti-resonant hollow core optical fiber preform of claim 1, wherein the central support tube is a hollow tube.

12. The anti-resonant hollow core optical fiber preform of claim 1, wherein an outer diameter of the central support tube is greater than an outer diameter of each of the plurality of structural tubes.

13. The anti-resonant hollow core optical fiber preform of claim 1, wherein an outer diameter of the central support tube is smaller than an outer diameter of each of the plurality of structural tubes.

14. A method of making an anti-resonant hollow core optical fiber preform, the method comprising:
bonding a central support tube to a plurality of structural tubes such that the plurality of structural tubes are disposed radially outward of the central support tube; and
providing a hollow outer cladding around the central support tube and the plurality of structural tubes,
wherein:
adjacent structural tubes are separated by a gap such that a minimum distance between adjacent structural tubes is from about 1 mm to about 5 mm, and
the plurality of structural tubes each extend for a length of the outer cladding and a length of the central support tube is about 10 cm or less and is less than the length of the outer cladding and each of the plurality of structural tubes.

15. The method of claim 14, further comprising bonding the central support tube to the plurality of structural tubes with a CO laser.

16. The method of claim 14, further comprising bonding the central support tube to the plurality of structural tubes by heating a film on the central support tube.

17. The method of claim 14, further comprising bonding the central support tube to the plurality of structural tubes by sintering silica frit on the central support tube.

18. The anti-resonant hollow core optical fiber preform of claim 1, wherein a thickness of the central support tube is greater than a thickness of each of the plurality of structural tubes.

* * * * *